(12) United States Patent
Ganesamoorthi et al.

(10) Patent No.: US 8,045,480 B2
(45) Date of Patent: *Oct. 25, 2011

(54) INTELLIGENT PROVISIONING OF DSP CHANNELS FOR CODEC CHANGES

(75) Inventors: Sai Suresh Ganesamoorthi, San Jose, CA (US); Balaji Krishnamoorthy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 875 days.

This patent is subject to a terminal disclaimer.

(21) Appl. No.: 12/050,770

(22) Filed: Mar. 18, 2008

(65) Prior Publication Data

US 2008/0159524 A1 Jul. 3, 2008

Related U.S. Application Data

(63) Continuation of application No. 11/003,744, filed on Dec. 2, 2004, now Pat. No. 7,369,502.

(51) Int. Cl.
*H04L 1/00* (2006.01)

(52) U.S. Cl. ........................ 370/252; 370/236

(58) Field of Classification Search .............. 370/477, 370/236; 455/557, 422
See application file for complete search history.

(56) References Cited

U.S. PATENT DOCUMENTS

| | | | |
|---|---|---|---|
| 5,208,804 A | 5/1993 | Wilson et al. | |
| 5,442,789 A | 8/1995 | Baker et al. | |
| 5,724,587 A | 3/1998 | Carmon et al. | |
| 5,842,014 A | 11/1998 | Brooks et al. | |
| 5,879,163 A * | 3/1999 | Brown et al. | 434/236 |
| 6,009,507 A | 12/1999 | Brooks et al. | |
| 6,038,294 A * | 3/2000 | Tran et al. | 379/93.07 |
| 6,266,342 B1 | 7/2001 | Stacey et al. | |
| 6,445,697 B1 | 9/2002 | Fenton | |
| 6,463,135 B2 | 10/2002 | Abrishami et al. | |
| 6,603,774 B1 | 8/2003 | Knappe et al. | |

(Continued)

FOREIGN PATENT DOCUMENTS

EP 1017244 A2 7/2000

OTHER PUBLICATIONS

Document by Cisco Systems, Inc., Understanding High Density Voice Network Modules, Aug. 13, 2002, 6 pages.

(Continued)

*Primary Examiner* — Thong Vu
(74) *Attorney, Agent, or Firm* — Marger, Johnson & McCollom, P.C.

(57) ABSTRACT

A communication system in which a profile of codecs is loaded at the originating end. The originating end sends the profile of codecs to the terminating end and receives in return an indication of which codec to use. The originating end and the terminating end create a reduced profile that includes the codec identified by the terminating side and its peers. The peers are codecs that use the same amount of resources as the selected codec or that use less resources than the selected codec. Even though the reduced profile includes more than one codec, packets are coded and decoded using only the codec identified by a bit map that is available to the DSP channel at both the originating end and the terminating end. At a later time a change can be made to a different codec in the reduced profile by changing the bitmap and without closing and re-opening the channel.

20 Claims, 3 Drawing Sheets

U.S. PATENT DOCUMENTS

| | | | |
|---|---|---|---|
| 6,714,630 B1 | 3/2004 | Baum | |
| 6,789,058 B2 | 9/2004 | Shlomot et al. | |
| 6,977,898 B1 | 12/2005 | Miriyala | |
| 7,010,611 B1 | 3/2006 | Wiryaman et al. | |
| 7,080,010 B2 | 7/2006 | Shlomot et al. | |
| 7,096,471 B2 | 8/2006 | Kosanovic | |
| 7,171,237 B2 * | 1/2007 | Vangala | 455/557 |
| 7,191,446 B2 | 3/2007 | Kosanovic | |
| 7,369,502 B2 * | 5/2008 | Ganesamoorthi et al. | 370/236 |
| 7,457,359 B2 * | 11/2008 | Mabey et al. | 375/240.01 |
| 7,468,983 B2 * | 12/2008 | Requena et al. | 370/401 |
| 7,529,289 B2 * | 5/2009 | Currivan et al. | 375/144 |
| 7,602,723 B2 * | 10/2009 | Mandato et al. | 370/236 |
| 7,756,594 B2 * | 7/2010 | Liu et al. | 700/94 |
| 7,830,864 B2 * | 11/2010 | Li | 370/352 |
| 2002/0040381 A1 | 4/2002 | Steiger et al. | |
| 2003/0084144 A1 | 5/2003 | Lipinski | |
| 2003/0156649 A1 | 8/2003 | Abrams, Jr. | |
| 2003/0179767 A1 | 9/2003 | Kloth et al. | |
| 2005/0122996 A1 * | 6/2005 | Azenkot et al. | 370/477 |
| 2005/0163108 A1 * | 7/2005 | Moore et al. | 370/352 |
| 2006/0072522 A1 | 4/2006 | Chandra et al. | |

OTHER PUBLICATIONS

Document by Cisco Systems, Inc., Release Notes for the Cisco ICS 7750 for System Software Release 1.0.x, Apr. 30, 2001, 99 pages.

U.S. Appl. No. 10/645,921, filed Aug. 20, 2003, entitled: Resource Reservation Method and System.

U.S. Appl. No. 10/231,783, filed Aug. 28, 2002, entitled: Method of Managing Signal Processing Resources.

* cited by examiner

INTELLIGENT PROVISIONING OF DSP CHANNELS FOR CODEC CHANGES

RELATED APPLICATION

1) The present application is a continuation of application Ser. No. 11/003,744 filed Dec. 2, 2004. The entire content of application Ser. No. 11/003,744 is hereby incorporated herein by reference. Priority is hereby claimed to the filing date of application Ser. No. 11/003,744.

2) The present application is also related to application Ser. No. 10/645,921 filed Aug. 20, 2003. The entire content of application Ser. No. 10/645,921 is hereby incorporated herein by reference.

FIELD OF THE INVENTION

This invention relates to electronic systems and more particularly to electronic systems that transmit information in packets.

BACKGROUND OF THE INVENTION:

Abbreviations used herein:
TDM Time Division Multiplexing
IP Internet Protocol
DSP Digital Signal Processor
LB Load Balancing
CCD Clear Channel Codec
ATM Asynchronous Transfer Mode
AAL ATM adaptation layer
ITU-T International Telecommunication Union Telecommunication Standardization Sector
AAL2 One of the four MLs recommended by the ITU-T.

As used herein, the term "voice gateway" means a device that converts voice TDM signals to packets that can be transmitted over a packet network. The term "call agent" means a device that sets up voice and data calls on voice gateways.

A voice gateway converts TDM voice signals into IP packets and it converts IP packets into TDM signals. A call agent communicates with a voice gateway to set up a call using a protocol such as the standard protocols know as MGCP or H.248. This typically is done over an IP network.

Voice gateways typically include a plurality of DSPs. The DSPs are programmed to terminate TDM voice calls. The DSPs compress the raw voice data into IP or ATM packets and decompress packets to TDM data. A DSP compresses a TDM data stream using a codec. The particular codec that is used for a particular call is typically negotiated between the gateways at the two ends of the call.

One DSP can generally handle a plurality of voice channels and a voice gateway generally includes a number of DSPs. The amount of resources used by a DSP to handle a particular call depends upon the particular codec used to handle call. Thus, the number of channels that a DSP can handle depends on factors such as the complexity of the codec used for each of the calls on that DSP.

There are a relatively large number of different codecs in widespread use. Each different codec has particular advantages and particular disadvantages. Generally, the different codecs use different amounts of resources. The particular codec which a system assigns to handle a particular call depends on various factors including the amount of resources available at the time the call is received.

When a channel is opened, the originating side examines the resources available and it chooses a particular DSP and a particular channel on the chosen DSP. The originating side also chooses a list of codecs. One of the reasons that a list of codecs is chosen by the originating side is to maximize the probability that during call set up, a matching codec can be found at the other end of the call. The codecs chosen by the originating side are all codecs that can operate with the resources available on the originating end. This list of codecs is frequently referred to as a profile. At call set up time the DSP at the originating side is set up to use any one of the codecs in the profile.

The originating side sends the profile (that is, the list) of codecs to the terminating side. The terminating side selects one particular codec from the list received. The selection is done according to a pre-established algorithm or in accordance with various pre-configured settings. For example the terminating side can be programmed to choose a codec that minimizes the packet bandwidth of calls or it can be programmed to choose a codec that maximizes the number of calls that can be handled. Generally a codec that minimizes bandwidth is a relatively complex codec and, hence, if a complex codec is chosen, the number of calls that can be handled is generally less than if a simple codec is chosen.

After the originating side receives an indication from the terminating side concerning which codec in the profile should be used, the call proceeds using the selected codec.

When a channel switches from voice to fax, the codec used generally must be changed. In the prior art this change was accomplished by closing and then re-opening the channel with the new codec. Closing and opening a channel takes time and requires processing cycles on the host microprocessor that controls the DSPs. If a channel must be closed and opened in order to change the codec being used, precious time is lost. Furthermore, sensitive applications such as a fax transmission could fail due to the time delay involved.

SUMMARY OF THE INVENTION

With the present invention, when the originating side receives an indication of which codec to use, it creates a reduced profile that includes the codec identified by the terminating side and the peers of the selected codec. The peers are codecs that use the same amount of resources as the selected codec or that use less resources than the selected codec. A map is provided to the DSP channels handling the call which indicates which particular codec in the reduced profile should be used for the particular call. Any packets received in a codec format other than the codec identified by the map will be reported as a packet violation.

If after a call has been set up with a particular codec, the channel switches to a fax codec, the channel does not have close and re-open the channel in order to use a fax new codec, (provided that the fax codec is in the reduced profile). That is, a channel can switch to fax codec in the reduced profile without need for closing and re-opening.

In some situations the terminating side can change codecs. If the terminating side changes to one of the codecs in the reduced profile, the channel can be switched to this codec without closing and re-opening.

In an alternate embodiment of the invention, only the originating side keeps the peer codecs in its profile. With this alternate embodiment, only the originating side can change codecs without closing and re-opening the channel.

DETAILED DESCRIPTION

Figure 1:
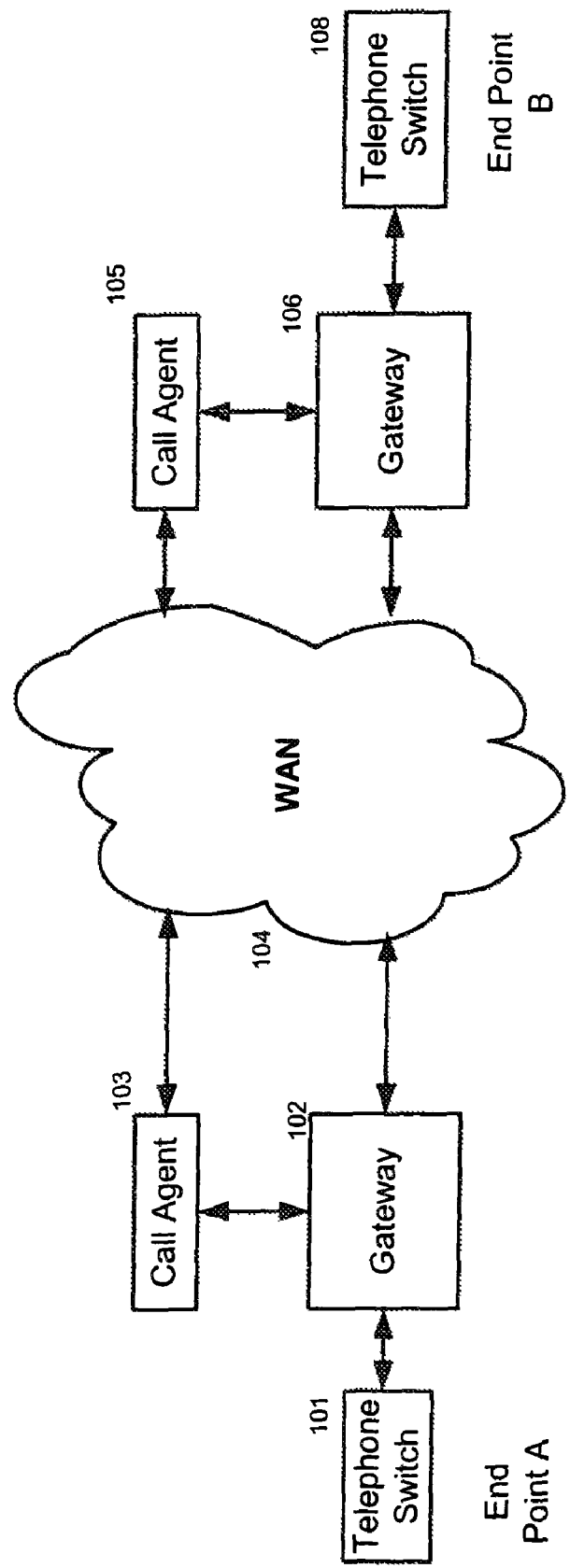
FIG. 1 is an overall system diagram.

An overall block diagram of a first embodiment of the present invention is shown in FIG. 1. The system shown includes, first and second end points designated A and B. In the example which will be described below a call originates from end point A and the call is terminated at end point B. However, it should be understood that calls can also originate at endpoint B and calls can be terminated at end point A.

In the embodiment shown, IP telephone switches 101 and 108 are located at the end points A and B. The IP telephone switches 101 and 108 are connected to gateways 102 and 106 in the normal manner. The gateways 102 and 106 are connected to a Wide Area Network (WAN) 104. WAN 104 can, for example, be the Internet. The system includes call agents 103 and 105 respectively connected to gateways 102 and 106. The call agents 103 and 105 establish the route through the network for calls from IP telephone switches 101 and 108. The telephone switches 101 and 108 are connected to telephones (not shown in the Figures) in a normal manner.

The telephone switches 101 and 108 provide analog TDM signals to the gateways and the gateways converts these signals to packets suitable for transmission over the packet network 104. A more detailed diagram of the gateways 102 and 106 is shown in FIG. 2A.

Figure 2A:
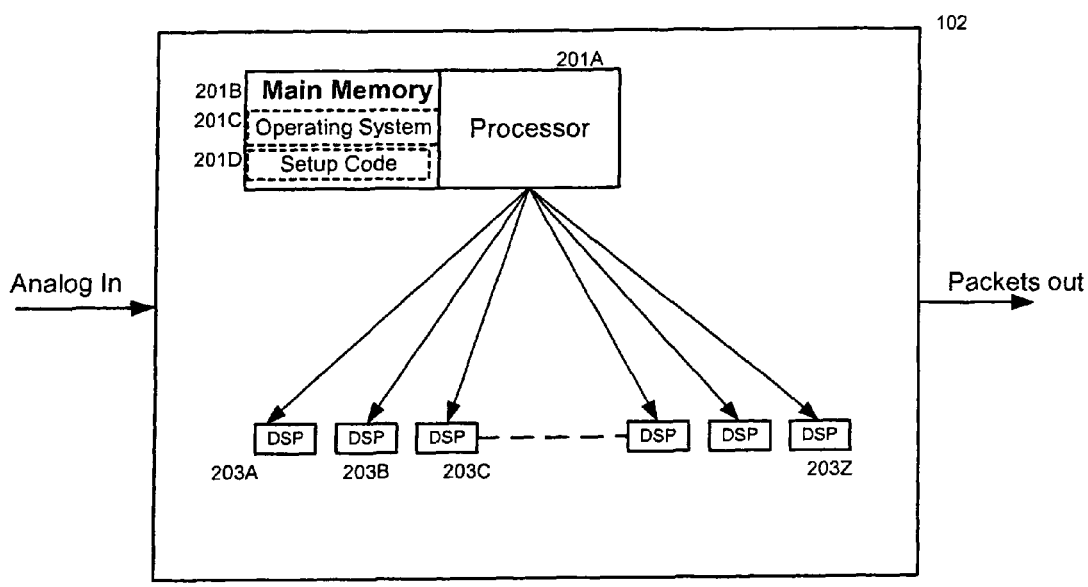
FIG. 2A is a block diagram of a gateway.

As shown in FIG. 2A, each gateway includes a microprocessor 201A, that has an associated main memory 201B. The main memory stores programs such as the operating system 201C and the call setup code 201D. The operating system 201C controls the overall operation of the gateway. The call setup code 201D handles the call setup operations. Various other programs may also be stored in main memory 201B. The programs in memory 201B are executed by microprocessor 201A. The telephone calls which pass through the gateway are processed by Digital Signal Processors (DSPs) 203. The gateway may include a large number of DSPs. For convenience of illustration only DSPs 203A, 203B, 203C and 203Z are shown. As is normal, each DSP can be programmed to handle a number of calls simultaneously. Each call is handled in a separate DSP channel.

Figure 2B:
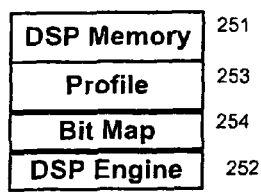
FIG. 2B is a block diagram of a DSP

The relevant parts of a representative DSP are shown in FIG. 2B. Each DSP has a DSP processor or engine 252, and a memory 251 which stores the codecs and programs that control the DSP. Each DSP also has a profile (or reduced-profile) storage 253 for each DSP channel and a bit map storage for each DSP channel. The profile (or the reduced-profile) identifies the codec that the DSP can use to code or to decode packets that it receives and sends. The bit map is set to identify one particular codec in the profile or reduced profile that should be used to code and decode packets for a particular call.

As shown in FIG. 1, there is a gateway at both the originating end of a call and at the terminating end of a call. Some of the operations which occur at the originating end of a call will be described first. Next, how a call is set up will be described. Finally, the flow diagram in FIG. 3 will be used to show the various steps in the operation of this embodiment of the invention.

When a call is received by the gateway, the call setup code 201D running on the gateways assigns a particular DSP and a particular DSP channel to the call. This can be done in a conventional manner. Usually a call is assigned to a particular DSP channel based, at least in part, upon the load on the various DSPs at that particular time.

When a call is assigned to a particular DSP channel, the call set up code running on the gateway selects a number of codecs for the call. This list of codecs is referred to as a profile. The selected profile is sent to the DSP channel assigned to the call and to the call agent at the originating end of the call. The call agent at the originating side of the call passes the profile to the call agent at the terminating side of the call. The call agent at the terminating end of the call sends a call setup request and the profile to the terminating gateway. The terminating gateway selects one codec from the profile and responds with a message to the originating gateway indicating which codec should be used for the call.

At this point the gateways create a reduced-profile of codecs. This reduced-profile contains the codec selected for the particular call and all the "peers" of the selected codec. The "peers" of the selected codec are all of the codecs in the original profile which:

a) Use the same amount of resources as the selected codec, or
b) That use less resources than the selected codec.

The profile of the DSP channels at the originating and terminating end of the call are then trimmed so that the profile only contains the selected codec and the peers of the selected codec (i.e., the reduced profile). A bit map is provided to the gateways that identifies the selected codec. Thus, even though the profile of the DSP channel contains multiple codecs, the bit map indicates to the DSP channel, the one, and only one codec that should be used to process packets. However, if during the call, events such as those described below occur, the bit map can be changed and the DSP channel can switch to any one of the codecs in the reduced-profile, without closing and re-opening the channel.

For example, if a channel switches to a fax codec, the system does not have to close and re-open the channel. Instead the channel can switch one of the other codecs in the reduced-profile without being closed and reopened. A fax codec is usually a simple codec, hence, it is highly likely that the reduced profile will contain a fax codec.

If the terminating side changes to one of the codecs on the reduced-profile, the channel can be switched to this codec without closing and re-opening. This is done by merely changing the bit map which identifies the particular codec that should be used to process packets during the call.

Figure 3:
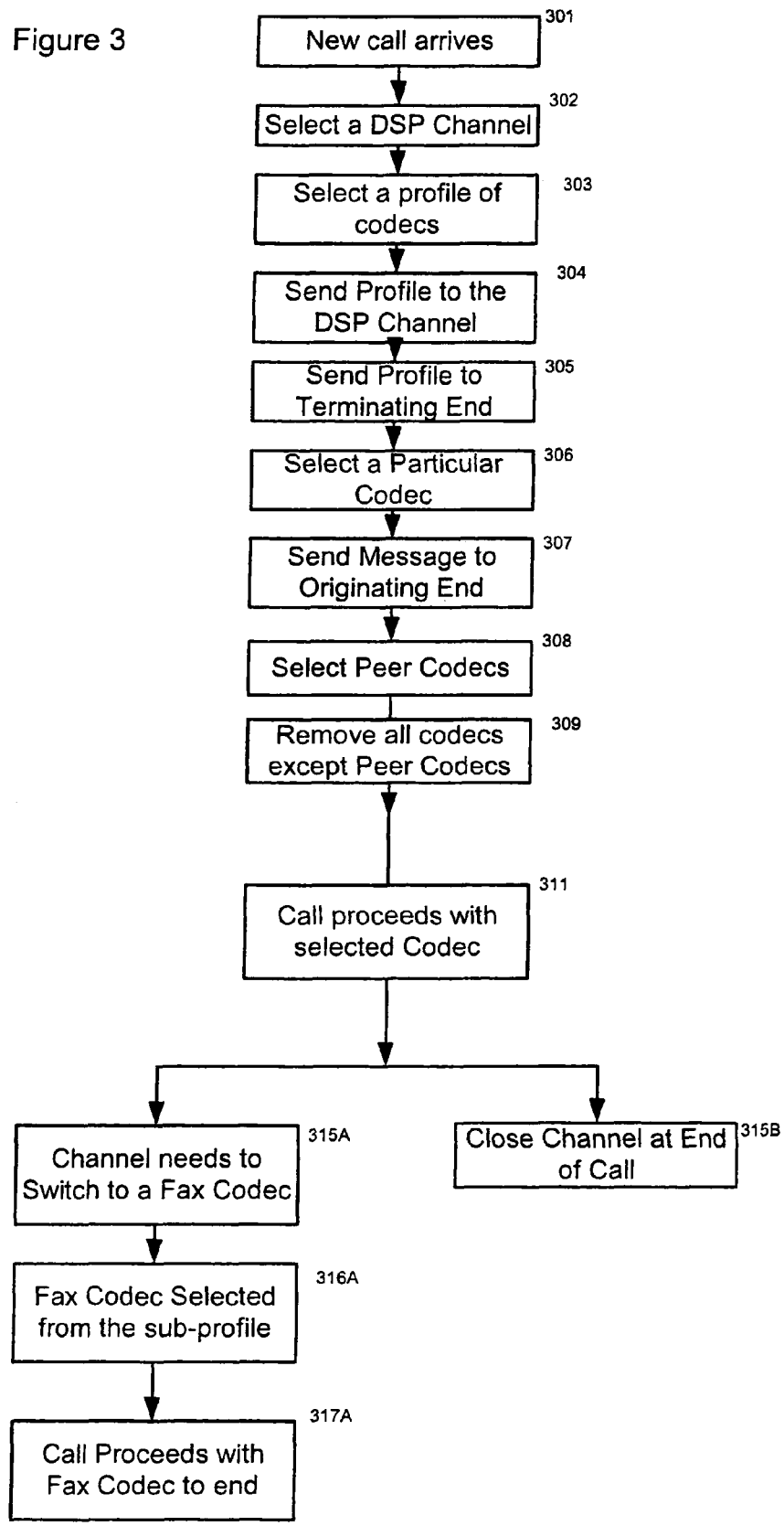
FIG. 3 is a flow diagram showing the operation of the system.

A block diagram showing the operation of the system is shown in FIG. 3. The process begins when a new call arrives at the originating end gateway, as indicated by block 301. In the specific example being illustrated here, the originating end gateway is gateway 102. For this example, it is assumed that the call agent 101 did not specify a particular codec that is to be used for the call.

A DSP channel is selected as indicated by block 302. This is done in a normal manner. That is, the call setup code 201D examines various factors such as the load on the various DSPs and it considers the requirements of the particular call. As a result of various considerations, the call setup code 201D selects a particular DSP channel to handle the call. This selection can be made in accordance with criteria established when the system is first set up or by some other process. For example, the selection can be made on a load balancing basis or on a best fit basis.

Next the system selects a profile (that is, a list) of suitable codecs for the call. This is indicated by block 303 in FIG. 3. Again this selection can be made based upon criteria established when the system is first set up or in some other normal manner.

Next, as indicated by block 304, the profile is sent to the selected DSP channel at the originating end. The profile is also sent to the call agent at the originating side of the call and from there to the call agent at the terminating end and then to the terminating gateway as indicated by block 305.

As indicated by block 306, the terminating end considers various factors such as minimizing packet bandwidth or maximizing call capacity of the gateway, and it selects a particular codec from the profile that it received. This selection process can be done in a normal manner.

A message is then sent from the terminating end to the originating end as indicated by block 307. This message includes an indication of the codec which the terminating end selected for use with the particular call.

Next both the originating end and the terminating end select the "peers" of the selected codec as indicated by block 308. The peers of the selected codec are those codecs in the original profile which use the same or less resources than the selected codec.

All the codecs, other than the selected codec and the peer codecs, are removed from profile at both the originating end and the terminating end as indicated by block 309. This forms a reduced profile. A bit map is provided to each of the gateways that identifies the profile selected for the call. Only this selected codec is used until the bit map is changed.

In an alternate embodiment, only the originating end maintains the reduced profile. In this alternate embodiment, the terminating end only keeps the selected codec in its profile. Stated differently, some embodiments keep the peer codecs in the profile at both the originating end and the terminating end, and other embodiments only keep the peer codecs in the profile at the originating end of the call.

After the profiles have been trimmed to the selected codec and its peers, the call then proceeds using the selected codec. This is indicated by block 311. For some calls, the operations proceed with this codec until the end of the call and at that time the channel is closed as indicated by block 315B. However for other calls, the type of operations illustrated by blocks 315A to 317A occur.

For example, as indicated by block 315A, the channel may switch to a fax codec. It is noted that, in general, a fax codec uses less resources than a voice codec, hence, the reduced-profile will probably include a fax codec. If the reduced profile includes a fax codex, the call proceeds with the fax codec as indicated by block 316A. This can occur without closing and re-opening the channel. All that needs to occur is that the bit map is changed so that it indicates the new codec.

The DSP channel will then proceed to process the call with a fax codec as indicated by block 317A until the end of the call.

The above described embodiment related to the voice over IP (VOIP) protocol. However, the invention can also be used with the voice over ATM protocol (VoATM). VOATM uses the AAL2 protocol. With respect to the present invention, the significant difference between VOATM (i.e. VoAAL2) and VoIP is that with the VoIP protocol, at setup time, the two ends negotiate and select one codec (as described above). However, with the AAL2 protocol, at setup time a profile of codecs is negotiated. We will call this an AAL2 profile.

In a VoIP embodiment, after the call has been fully setup there will be one selected codec and bitmap will identify only this codec even though there are other codecs in the "reduced-profile".

With the AAL2 protocol, at setup time an AAL2 profile (which contains multiple codecs) is negotiated. Hence with the AAL2 protocol, after the call is setup each of the two ends can have a list of codecs that they can use. Packets in any of the codec formats specified in the AAL2 profile will be handled without packet violations. For example a standard AAL2 profile may specify three codecs C1, C2 and C3. If the DSP channel is currently working with C1 and it starts receiving C2 packets, they are treated as valid and not as packet violations.

An embodiment of the present invention using the AAL2 protocol would operate as follows: If the original AAL2 profile contained the codecs C1, C2 and C3, the "AAL2 reduced profile" would for example be C1, C2, C3, C1$a$, C2$a$, C2$b$, C3$a$ where the a, b and c codecs are all peers of the C1, C2 and C3 codecs. Note in this case the bitmap setting will be "ON" for codecs C1, C2 and C3 and "OFF" for the rest of the codecs. In such a case where there was a change in the AAL2 profile and a new AAL2 profile negotiated, if the new AAL2 profile happens to be C1$a$, C2$b$, C3$a$ then the channel need not be closed and re-opened. The above shows the applicability of the present invention with the AAL2 protocol.

It is noted that the operations shown in FIG. 3 are performed and controlled by a programmed micro-processor. That is, the processor 201A executing operating system 201C and the call setup code 201D would cause the system to perform the operations shown in FIG. 3.

It is noted that the particular embodiment shown herein, relates to a voice gateway; however, other embodiments could use the same method and system to allocate codecs in other types of environments.

While the invention has been shown and described with respect to preferred embodiments thereof, it should be understood that other changes in form and detail can be made without departing from the spirit and scope of the invention. The scope of the invention is limited only by the appended claims.

We claim:

1. A method of specifying codecs for use in processing a call at the originating end of said call, said method including the steps of:
    selecting a profile of codecs to use in handling said call,
    transmitting said profile to another unit handling said call,
    receiving a selection of a codec that is selected from said profile of codecs,
    creating a reduced profile that includes the selected codec and all its peer codecs, and
    utilizing a codec is said reduced profile to process said call.

2. The method in claim 1 wherein said reduced profile of codecs includes a plurality of codecs that use the same amount or less resources than said selected codec.

3. The method recited in claim 1 wherein said method includes receiving a bit map which identifies said selected codec in said profile of codecs.

4. The method recited in claim 1 wherein said peer codecs are codecs that use the same amount or less resources than said selected codec.

5. The method recited in claim 1 wherein said peer codecs are the codecs in said profile of codecs that use the same amount or less resources than a selected codec, and said selected codec and said peer codecs form said reduced-profile of codecs.

6. The method recited in claim 1 wherein said system can change from said selected codec to another codec in said reduced-profile without closing and re-opening said channel.

7. The method in claim 1 wherein said call is transmitted by said originating end utilizing Internet Protocol packets.

8. The method in claim 7 wherein packets transmitted contain an Asynchronous Transfer Mode (ATM) coded telephone call, and said profile and said reduced profiles are respectively an Asynchronous Transfer Mode Adaptation Layer 2 (AAL2) profile and an AAL2 reduced profile.

9. The method of claim 1 wherein the receiving end of said call receives a profile of codecs to use in handling said call from said originating end of said call, selects of a codec from said profile of codecs, transmits an identification of said selected codec to said originating end, and utilizes said selected codec to process said call.

10. An Apparatus that specifies codecs for use in processing a call at the originating end of said call, said apparatus including:

means for selecting a profile of codecs to use in handling said call, means for transmitting said profile to another unit handling said call, means for receiving a selection of a codec that is selected from said profile of codecs, and means for creating a reduced profile that includes the selected codec and all peer codecs of said selected codec, and means for utilizing a codec in said reduced profile to process said call.

11. The apparatus in claim 10 wherein said reduced profiles of codecs include a plurality of codecs that use the same amount or less resources than said selected codec.

12. The apparatus recited in claim 10 wherein said apparatus includes means to receive a bit map which identifies said selected codec in said profile of codecs.

13. The apparatus recited in claim 10 wherein said means for creating a reduced profile creates a reduced profile that includes said selected codec and peer codecs that use the same amount or less resources than said selected codec.

14. The apparatus recited in claim 10 wherein said peer codecs are the codecs in said profile of codecs that use the same amount or fewer resources than said selected codec, and said selected codec and said peer codecs form said reduced-profile of codecs.

15. The apparatus in claim 10 wherein said profile and said reduced profiles are respectively an Asynchronous Transfer Mode Adaptation Layer 2 (AAL2) profile and an AAL2 reduced profile.

16. A method of specifying a codec for use in processing a call at the receiving end of said call, said method including the steps of:

receiving a profile of codecs to use in handling said call, selecting of a codec from said profile of codecs, transmitting an identification of said selected codec, and utilizing said selected codec to process said call.

17. The method recited in claim 16 including receiving a reduced profile of codecs.

18. The method of claim 17 wherein said reduced profile of codecs includes codecs in said profile of codecs that use the same amount or fewer resources than said selected codec.

19. The method of claim 17 where said profile is an Asynchronous Transfer Mode Adaptation Layer 2 (AAL2) profile.

20. The method of claim 17 wherein said reduced profiles is an Asynchronous Transfer Mode Adaptation Layer 2 reduced profile.

* * * * *